United States Patent [19]

Carette et al.

[11] Patent Number: 5,278,218
[45] Date of Patent: Jan. 11, 1994

[54] ZINC STANNATE/ZINC HYDROXYSTANNATE HEAT-STABILIZED CHLOROPOLYMERS

[75] Inventors: Louis Carette, Issy Les Moulineaux; Francois Pouenat, Paris, both of France

[73] Assignee: Rhone-Poulenc Chimie, Courbevoie, France

[21] Appl. No.: 964,472

[22] Filed: Oct. 21, 1992

Related U.S. Application Data

[63] Continuation of Ser. No. 804,675, Dec. 10, 1991, abandoned.

[30] Foreign Application Priority Data

Dec. 10, 1990 [JP] Japan ..................................... 2-15737

[51] Int. Cl.⁵ ................................................ C08K 3/24
[52] U.S. Cl. .................................... 524/434; 524/303; 524/304; 524/357; 524/399; 524/436
[58] Field of Search ............... 524/434, 357, 303, 304, 524/399, 436

[56] References Cited

U.S. PATENT DOCUMENTS

| | | | |
|---|---|---|---|
| 3,810,861 | 5/1974 | Tacke et al. | 524/434 |
| 3,829,400 | 8/1974 | Kato et al. | 524/434 |
| 3,900,441 | 8/1975 | King | 524/406 |
| 4,102,839 | 7/1978 | Crochemore et al. | 524/400 |

FOREIGN PATENT DOCUMENTS

| | | |
|---|---|---|
| 0391811 | 10/1990 | European Pat. Off. . |
| 2236893 | 6/1974 | France . |
| 50-24531 | 3/1975 | Japan . |
| 53-56248 | 5/1978 | Japan . |
| 9009962 | 9/1990 | PCT Int'l Appl. . |

OTHER PUBLICATIONS

Database WPIL, Abstract No. 91-058129 [08], Derwent Publications Ltd., "Flame retardant halogenated polymer composition".
Specialty Chemicals 1989, vol. 9, No. 3, pp. 194, 196, 198, 200, 202; P. Cusack et al.: "Investigations into tin--based flame retardants and smoke suppressants".

*Primary Examiner*—Veronica P. Hoke
*Attorney, Agent, or Firm*—Burns, Doane, Swecker & Mathis

[57] ABSTRACT

Chlorine-containing polymers, e.g., PVC and poly(-vinylidene chloride), are effectively heat-stabilized by formulating therewith at least one zinc stannate and/or at least one zinc hydroxystannate, characteristically in combination with at least one organozinc compound, at least one organocalcium, organobarium, organomagnesium or organolanthanide compound, and at least one beta-ketoaldehyde, beta-diketone, 1,4-dihydropyridine monomer or polymer, beta-ketoester, beta-aminocrotonic ester, mercaptocarboxylic ester or alpha-phenylindole.

23 Claims, No Drawings

ZINC STANNATE/ZINC HYDROXYSTANNATE HEAT-STABILIZED CHLOROPOLYMERS

This application is a continuation of application Ser. No. 07/804,675, filed Dec. 10, 1991 now abandoned.

BACKGROUND OF THE INVENTION

1. Field of the Invention

The present invention relates to novel compositions of matter based on chlorine-containing polymer and comprising an effective stabilizing amount of a zinc stannate and/or zinc hydroxystannate.

This invention also relates to the use of the zinc stannates and/or zinc hydroxystannates as heat stabilizers for chlorine-containing polymers.

The chlorine-containing polymers to which the present invention relates are, in particular, poly(vinyl chloride) (PVC), which is the most significant commercially; poly(vinylidene chloride); copolymers predominantly comprised of vinyl chloride recurring units prepared from vinyl chloride and other monomers copolymerizable therewith; and mixtures of polymers or copolymers, a predominant proportion of which is derived from vinyl chloride.

In general, any type of PVC is suitable, whatever the process for the preparation thereof - bulk polymerization, suspension polymerization, dispersion polymerization or any other type—and whatever its intrinsic viscosity.

The homopolymers of vinyl chloride may also be chemically modified, for example by chlorination.

Numerous copolymers of vinyl chloride may also be stabilized against the adverse effects of heat, namely, yellowing and degradation. These are, notably, the copolymers prepared by copolymerization of vinyl chloride with other olefinically unsaturated comonomers copolymerizable therewith, such as, for example, vinyl acetate or vinylidene chloride; maleic or fumaric acids or their esters; olefins, such as ethylene, propylene and hexane; acrylic or methacrylic esters; styrene; and vinyl ethers such as vinyl dodecyl ether.

These copolymers typically contain at least 50% by weight of vinyl chloride recurring units and preferably at least 80% by weight of vinyl chloride recurring units.

The compositions according to the invention may also comprise mixtures based on chlorine-containing polymers containing minor amounts of other polymers, such as halogenated polyolefins or acrylonitrile-/butadiene/styrene copolymers.

PVC, whether alone or in admixture with other polymers, is the primary chlorine-containing polymer comprising the compositions of the present invention.

2. Description of the Prior Art

It is known to this art that the conversion of chlorine-containing polymers, and more particularly of PVC, at elevated temperatures cannot be accomplished without the addition of heat stabilizers thereto.

Indeed, if the chlorine-containing polymer is heated to processing temperatures, objectionable coloration appears which alter its appearance, an important characteristic for numerous applications.

This disadvantage is overcome by incorporating therein stabilizers essentially consisting of metal or organometallic compounds adopted, in particular, to absorb the hydrochloric acid produced by the degradation of the polymer.

These heat stabilizers are essentially organic derivatives of zinc or cadmium in combination with organic derivatives of calcium, barium or magnesium.

They may be accompanied by other compounds, typically designated "costabilizers" or "secondary stabilizers", the purpose of which is to supplement and intensify their effect, in particular as regards the appearance characteristics of the final product.

This is the case with mixed metal systems based on derivatives of cadmium and barium, or of zinc and barium, or of zinc and calcium, which have to be accompanied by costabilizers such as epoxide compounds, organic phosphites, dihydropyridines and/or betadiketones.

Among these metal systems, those which include cadmium derivatives are becoming less and less used, because of the deleterious effects of cadmium.

The formulations of chlorine-containing polymers containing combinations of organic derivatives of zinc and barium, or organic derivatives of zinc and calcium, with organic costabilizers, are typically suitable for such applications as, for example, the production of shaped transparent rigid bottles or films for exterior use.

However, in certain instances—severity of the conditions of thermodynamic conversion, intrinsic instability of certain such polymers—it is necessary to increase the effectiveness of the customary stabilizers insofar as the appearance of the final product is concerned, and especially the permanence of this effectiveness, when the thermal stresses are intensified and prolonged.

SUMMARY OF THE INVENTION

Accordingly, a major object of the present invention is the provision of improvedly heat-stabilized compositions based on chlorine-containing polymers, more particularly based on PVC, such improved compositions comprising an effective heat-stabilizing amount of a zinc stannate and/or a zinc hydroxystannate in combination with a typical organometallic stabilizer and organic costabilizer.

DETAILED DESCRIPTION OF THE PREFERRED EMBODIMENTS OF THE INVENTION

More particularly according to the present invention, the subject heat-stabilized compositions based on a chlorine-containing polymer advantageously comprise (i) at least one organozinc compound, (ii) at least one organocalcium, organobarium, organomagnesium or organolanthanide compound, (iii) at least one organic secondary stabilizer comprising a beta-ketoaldehyde, a beta-diketone, a 1,4-dihydropyridine monomer or polymer, a beta-ketoester, a beta-aminocrotonic ester, a mercaptocarboxylic ester or an alpha-phenylindole, and (iv) at least one zinc stannate and/or zinc hydroxystannate.

The organozinc compounds are advantageously the zinc carboxylates and zinc phenolates.

Particularly exemplary thereof are, for example, the zinc salts of maleic, acetic, diacetic, propionic, hexanoic, octanoic, 2-ethylhexanoic, decanoic, undecanoic, lauric, myristic, palmitric, stearic, oleic, ricinoleic, behenic, hydroxystearic, hydroxyundecanoic, benzoic, phenylacetic, para-tert-butylbenzoic butylbenzoic and of salicylic acids; and zinc phenolates of phenol and of phenols substituted by one or more alkyl radicals, such as the nonylphenols.

For practical purposes or for economic reasons, zinc propionate, zinc octanoate, zinc 2-ethylhexanoate, zinc laurate, zinc stearate, zinc oleate, zinc ricinoleate, zinc benzoate, zinc para-tert-butylbenzoate, zinc salicylate, zinc mono(2-ethylhexyl) maleate and zinc nonylphenates are the preferred.

In general, the organozinc compounds constitute from 0.0054 to 1% by weight relative to the chlorine-containing polymer, and preferably from 0.01% to 0.6% by weight.

The organic compounds of calcium, magnesium, barium and the lanthanides are preferably the carboxylates and the phenolates of these metals.

Particularly exemplary are, for example, the calcium, magnesium, barium and lanthanide salts of maleic, acetic, diacetic, propionic, hexanoic, octanoic, 2-ethylhexanoic, decanoic, undecanoic, lauric, myristic, palmitic, stearic, oleic, ricinoleic, behenic, hydroxystearic, hydroxyundecanoic, benzoic, phenylacetic, para-tert-butylbenzoic and salicylic acid; and the calcium, magnesium, barium and lanthanide phenolates of phenol and of phenols substituted by one or more alkyl radicals, such as the nonylphenols.

For practical purposes or for economic reasons, the following are the preferred organic compounds of calcium, magnesium, barium and the lanthanides: the propionic, octanoic, 2-ethylhexanoic, lauric, stearic, oleic, ricinoleic, benzoic, para-tert-butylbenzoic and salicylic acid salts, and the mono(2-ethylhexyl) maleate and the nonylphenates of these metals.

Typically, the organic calcium, magnesium, barium and lanthanide compounds constitute from 0.005% to 5% by weight relative to the weight of the chlorine-containing polymer, and preferably from 0.02% to 2% by weight.

For food-contact applications and especially for PVC bottles, organic calcium compounds or mixtures of organic calcium compounds/organic magnesium compounds are used.

Among the organic secondary stabilizers, the $\beta$-diketones or $\beta$-ketoaldehydes are very particularly effective.

These $\beta$-diketones have been described, in particular, in FR-2,292,227, FR-2,324,681, FR-2,351,149, FR-2,352,025, FR-2,383,988 and FR-2,456,132 and in EP-0,040,286 and EP-0,046,161.

Particularly exemplary such 0-diketones include benzoylstearoylmethane, dibenzoylmethane, benzoylacetone, lauroylacetone, decanoylacetone, benzoyl-3-methylbutanoylmethane, methoxycarbonylbenzoylbenzoylmethanes, and such bis-$\beta$-diketones as 1,4-bis(acetylaceto)butane, 1,8bis(benzoylaceto)octane and 1,4-bis(acetylaceto)benzene.

The $\beta$-diketones generally constitute from 0.005% to 5% by weight relative to the weight of the chlorine-containing polymer, and preferably from 0.01% to 2% by weight.

The 1,4-dihydropyridines are also useful organic stabilizers in the compositions of the invention.

Particularly exemplary thereof are 1,4-dihydro-2,6-dimethylpyridine-3,5-dicarboxylate monomers, such as those described in FR-A-2,239,496, FR-A-2,405,974 and FR-A-2,405,937, or polymers, such as described in EP-A-286,887.

Usually, these 1,4-dihydropyridines are effective in concentrations of 0.01% to 5% by weight relative to the weight of chlorine-containing polymer, and preferably 0.05% to 2% weight/weight.

Beta-diketones or beta-ketoaldehydes may be used conjointly with the 1,4-dihydropyridines. The overall amounts of these mixtures of compounds are then those indicated, respectively, for each of them.

Among the other organic stabilizers which may be incorporated into the compositions according to the invention, the following are exemplary:

(a) beta-keto esters and more particularly ketoacetic acid esters, as described, in particular, in FR-A-1,435,882 and U.S. Patent No. 2,669,548;

(b) 2-phenylindole and derivatives thereof, such as those described in FR-A-2,273,841, FR-A-2,275,461 and FR-A-2,313,422;

(c) beta-aminocrotonic esters, more particularly long-chain alkyl beta-aminocrotonates, typically $C_{12}$ to $C_{20}$ alkyl beta-aminocrotonates, and thioalkylene glycol beta-aminocrotonates; and (d) mercaptocarboxylic acid esters and, more particularly, thioglycolic acid esters, such as those described in FR-A-2,459,816; thiomalic acid diesters, such as those described in EP-A-0,090,748; and 2-mercaptopropionic acid esters, such as those described in FR-A-2,552,440.

The organic stabilizers indicated above constitute from 0.01% to 5% by weight relative to the weight of the chlorine-containing polymer, and preferably from 0.05% to 2% weight/weight.

The zinc stannates and zinc hydroxystannates are more particularly zinc mestastannate $ZnSnO_3$, zinc orthostannate $Zn_2O_4Sn$ and z inc hydroxystannate $ZnSn(OH)_6$.

These compounds are per se known to this art. Particularly compare P. Pascal, *Nouveau Traite de Chimie Minerale* (New Treatise on Inorganic Chemistry), volume VIII, for techniques for the preparation thereof.

These formulae are generally accepted, but there may be discrepancies among various authors, in particular with regard to the hydroxystannate, which is sometimes represented as zinc metastannate trihydrate: $ZnSnO_3.3H_2O$.

Zinc metastannate and zinc hydroxystannate are the preferred for incorporation into the compositions according to the invention.

The zinc stannate and/or zinc hydroxystannate typically constitute from 0.01% to 5% by weight relative to the weight of chlorine-containing polymer, and preferably from 0.05 to 34 weight/weight.

For conversion into bottles, in particular water bottles, the preferred amount of zinc stannate and/or zinc hydroxystannate ranges from 0.05% to 0.5% weight/weight of chlorine-containing polymer (PVC).

Other than their function as heat costabilizers according to the present invention, zinc stannates and zinc hydroxystannate serve a known flameproofing function. It is therefore possible to significantly increase the amounts of these compounds in the PVC if it is desired to impart the dual effect of heat stabilization and flameproofing.

The compositions of the invention may contain other secondary heat stabilizers, which may be inorganic, such as, in particular, hydrotalcites and dawsonite, or organic, such as, in particular, polyols and phosphites.

Hydrotalcites are alkaline mixed magnesium aluminum carbonates or sulfates. The hydrotalcites described in FR-A-2,483,934 are particularly suitable.

Dawsonite is a basic aluminum sodium carbonate. It is a carbonate in monoclinic crystalline form which is generally represented by the formula $NaAl(OH)_2CO_3$. It is described, in particular, in the general publications on inorganic chemistry, such as, for example, P. Pascal, *Nouveau Traite de Chimie Minerale* (New Treatise on Inorganic Chemistry), volume II.

These inorganic stabilizers are typically present in an amount from 0% to 5% by weight relative to the chlorine-containing polymer, and preferably from 0.02% to 2%.

The polyols typically provide the advantage of prolonging the lifetime of chlorine-containing polymers subjected to a heat treatment.

Generally, it is preferable that the polyols used should have a boiling point higher than 150° C. and preferably higher than 170° C., because of the downstream processing of the chlorine-containing polymers at high temperature.

Exemplary such polyols include the triols, such as trimethylolpropane, glycerol, 1,2,6-hexanetriol, 1,2,4-butanetriol and trishydroxyethyl isocyanurate; tetrols, such as pentaerythritol and diglycerol; pentitols, such as xylitol and tetramethylolcyclohexanol; hexitols, such as mannitol, sorbitol and dipentaerythritol; polyols which are partially esterified with a carboxylic acid and which contain at least 3 free hydroxyl groups; and polyvinyl alcohols, in particular those in which less than 30 mol% of ester groups remain, relative to the sum of their ester and hydroxyl groups.

The preferred polyols include xylitol, mannitol, sorbitol, trimethylolpropane, tetramethylolcyclohexanol and the polyvinyl alcohols defined above.

When present in the compositions of the invention, in general from 0.0054 to it by weight of polyol, relative to the chlorine-containing polymer, and preferably from 0.014 to 0.6% by weight, is incorporated.

The compositions according to the invention may also contain organic phosphites, in particular aliphatic phosphites or aromatic phosphites, or mixed aliphatic and aromatic phosphites.

If it is present, the phosphite typically represents from 0.05% to 5% by weight relative to the chlorine-containing polymer and preferably from 0.1% to 2% by weight.

The compositions according to the invention may also contain the customary additives and adjuvants, such as phenolic antioxidants; or anti-UV agents, such as benzophenones, benzotriazoles or sterically hindered amines (generally designated as HALS).

The compositions of the invention may also contain epoxides, in particular epoxidized polyglycerides, such as epoxidized soya oil, epoxidized linseed oil, epoxidized fish oils or expoxidized tall oil.

However, in order to prevent a lowering of the viscosity index of the chlorine-containing polymer, such oils are generally used in as small an amount as possible, depending on the intended final application of the compositions.

Usually, if they are present, the epoxides represent from 0.054 to 5% by weight relative to the weight of the chlorine-containing polymer, and more specifically from 0.1% to 2% by weight.

The compositions of the invention may be rigid formulations, namely, devoid of plasticizer, or semirigid formulations, namely, having reduced plasticizer contents, such as for applications in the construction industry or for the production of bottles.

They may also be plasticized formulations, such as for the production of films for agricultural use.

These plasticizers are known compounds, such as, for example, alkyl phthalates. The plasticizer most typically used is dioctyl phthalate.

If the compositions contain a plasticizer, the amount thereof generally ranges from 54 to 120% by weight relative to the weight of chlorine-containing polymer.

Customarily, the incorporation of the various stabilizers or adjuvants is carried out on the chlorine-containing polymer in the pulverulent state.

It is of course possible to prepare a mixture of two or more constituents forming part of the compositions according to the invention before they are incorporated into the chlorine-containing polymer.

Any of the usual techniques for the incorporation of the various stabilizers or adjuvants into the polymer may be used. For example, the homogenization of the polymer composition may be carried out in a kneader or on a roll mill, at a temperature such that the composition becomes fluid, usually ranging from 150° C. to 200° C. in the case of PVC, and for a sufficient time, on the order of a few minutes to a few tens of minutes.

The chlorine-containing polymer, and more particularly PVC, compositions may be processed by any of the techniques typically employed in this art, such as, for example, extrusion, injection, blown film extrusion, calendering or rotational molding.

In order to further illustrate the present invention and the advantages thereof, the following specific examples are given, it being understood that same are intended only as illustrative and in nowise limitative.

EXAMPLES

The following formulations were prepared:

| | | |
|---|---|---|
| (i) | pulverulent PVC prepared by suspension polymerization, having a viscosity index of 70 (K value = 57): | 100 g |
| (ii) | impact strength improver (methyl methacrylate/butadiene/styrene copolymer): | 8 g |
| (iii) | lubricant based on rosin ester (E wax) | 2.05 g |
| (iv) | epoxidized soya oil: | 5 g |
| (v) | zinc octanoate (Zn 2-ethylhexanoate): | see Table |
| (vi) | calcium stearate: | 0.2 g |
| (vii) | stearoylbenzoylmethane | 0.25 g |
| (viii) | Zn mestastannate or Zn hydroxystannate: | see Table |

The PVC and the various additives were premixed at ambient temperature in a high-speed mixer.

The time necessary to achieve good homogenization was about 5 min.

The homogeneous mixtures thus obtained were introduced into a plastograph (manufactured by BRABENDER) consisting of a heated vessel in which the blades counter-rotated in order to knead the polymer and the additives.

The vessel contained 32 g of composition; the temperature was maintained at 180° C. and the speed of rotation of the blades was 60 revolutions/min.

Samples were withdrawn after kneading under these conditions at 5 min, 10 min and 15 min and the color of the withdrawn samples was measured and is expressed as yellowness index, in accordance with ASTM Standard D 1925 (the higher the value of this index, the greater the coloration of the sample).

Hot kneading of each composition was continued until the PVC was entirely degraded and assumed a carbonaceous appearance (carbonization).

The effectiveness of the stabilizers was thus evaluated by:

(a) the coloration (measured as yellowness index) observed on the first sample withdrawn, (b) the level of stability of the coloration of the subsequent samples withdrawn, and (c) the time required to reach the carbonization state.

The following Table reports the values of the yellowness index and the carbonization time for the formulations, specifying the amount of Zn metastannate, Zn hydroxystannate and Zn octanoate contained therein.

Examples 1 and 2 are tests according to the invention, whereas tests A to M are given by way of comparison.

TABLE

| Tests | Zn octanoate | Zn stannate | Zn hydroxystannate | Yellowness index, Samples withdrawn after | | | Carbonization time |
|---|---|---|---|---|---|---|---|
| | | | | 5 min | 10 min | 15 min | |
| Example 1 | 0.1 g | 0.1 g | 0 | 30 | 41 | 65 | 65 min |
| Example 2 | 0.1 g | 0 | 0.1 g | 28 | 29 | 55 | 65 min |
| Test A | 0.1 g | 0 | 0 | 29 | 44 | 68 | 60 min |
| Test B | 0 | 0.1 g | 0 | red | >200 | >200 | 65 min |
| Test C | 0 | 0 | 0.1 g | red | >200 | >200 | 65 min |
| Test D | 0.2 g | 0 | 0 | 40 | 55 | 65 | 20 min |
| Test E | 0 | 0.2 g | 0 | red | >200 | >200 | 65 min |
| Test F | 0 | 0 | 0.2 g | red | >200 | >200 | 65 min |
| Test G | 0.251 g | 0 | 0 | 40 | 50 | black | 15 min |
| Test H | 0.222 g | 0 | 0 | 50 | 60 | 114 | 20 min |
| Test J | 0 | 0.065 g | 0 | red | >200 | >200 | 65 min |
| Test K | 0 | 0.165 g | 0 | red | >200 | >200 | 65 min |
| Test L | 0 | 0 | 0.08 g | red | >200 | >200 | 65 min |
| Test M | 0 | 0 | 0.18 g | red | >200 | >200 | 65 min |

It was observed that the addition of Zn metastannate or Zn hydroxystannate (Examples 1 and 2) to a composition of good thermal stability according to the prior art (test A) improved the time before carbonization (65 min instead of 60 min) and in particular retarded development of coloration.

This remained valid if Examples 1 and 2 were compared, respectively, with tests D, E and F, which contained equal total amounts by weight of Zn compounds; it was even noted that with 0.2 g of Zn octanoate, the results obtained were poorer than with 0.1 g (test D compared with test A).

Finally, the comparison with equal total molar amounts of Zn evidenced that the combination of Zn octanoate/Zn metastannate or Zn hydroxystannate produced the best results, although Zn mestastannate or Zn hydroxystannate alone produced unusable compositions (red at the very first sampling) and Zn octanoate alone produced a more rapid development of the coloration and resulted in a very short carbonization time.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is

1. A heat-stable composition, comprising at least one chlorine-containing polymer and an effective heat-stabilizing amount of (i) at least one organozinc compound, (ii) at least one organocalcium, organobarium, organomagnesium or organolanthanide compound, (iii) at least one beta-ketoaldehyde, beta-diketone, 1,4-dihydropyridine monomer or polymer, beta-ketoester, beta-aminocrotonic ester, mercaptocarboxylic ester or alpha-phenylindole secondary heat-stabilizer, and (iv) at least one zinc stannate and/or at least one zinc hydroxystannate.

2. The heat-stable composition as defined by claim 1, said at least one chlorine-containing polymer comprising poly(vinyl chloride), poly(vinylidene chloride); a copolymer which comprises a predominant amount of vinyl chloride recurring structural units and a minor amount of comonomeric recurring structural units; and a mixture of polymers or copolymers predominantly comprising vinyl chloride recurring structural units.

3. The heat-stable composition as defined by claim 1, comprising (iv) zinc metastannate and/or zinc hydroxystannate.

4. The heat-stable composition as defined by claim 1, said at least one organozinc compound (i) comprising a zinc carboxylate or zinc phenolate.

5. The heat-stable composition as defined by claim 1, said at least one organocalcium, organobarium, organomagnesium or organolanthanide compound (ii) comprising a carboxylate or phenolate.

6. The heat-stable composition as defined by claim 1, said at least one organozinc compound (i) constituting from 0.005% to 1% by weight of said chlorine-containing polymer, and said at least one organocalcium, organobarium, organomagnesium or organolanthanide compound (ii) constituting from 0.005% to 5% by weight of said chlorine-containing polymer.

7. The heat-stable composition as defined by claim 1, said at least one zinc stannate and/or zinc hydroxystannate (iv) constituting from 0.01% to 5% by weight of said chlorine-containing polymer.

8. The heat-stable composition as defined by claim 1, comprising (iii) at least one β-diketone or β-ketoaldehyde.

9. The heat-stable composition as defined by claim 8, comprising at least one β-diketone selected from among benzoylstearoylmethane, dibenzoylmethane, benzoylacetone, lauroylacetone, decanoylacetone, benzoyl-3-methylbutanoylmethane, and a methoxycarbonylbenzoyl-benzoylmethane, or at least one bis-β-diketone selected from among 1,4-bis(acetylaceto)butane, 1,8-bis(benzoyl-aceto)octane and 1,4-bis(acetylaceto)benzene.

10. The heat-stable composition as defined by claim 8, comprising from 0.005% to 54 by weight of said β-diketone.

11. The heat-stable composition as defined by claim 1, comprising (iii) from 0.01% to 5% by weight of at least one 1,4-dihydropyridine monomer or polymer relative to the weight of said chlorine-containing polymer.

12. The heat-stable composition as defined by claim 1, comprising (iii) at least one ketoacetic acid ester, 2-phenylindole or derivative thereof, $C_{12}$ to $C_{20}$-alkyl beta-aminocrotonate or thioalkylene glycol beta-aminocrotonate, or thioglycolic acid ester, thiomalic acid diester, or 2-mercaptopropionic acid ester.

13. The heat-stable composition as defined by claim 1, comprising a heat-stabilizing amount of at least one hydrotalcite or dawsonite.

14. The heat-stable composition as defined by claim 13, comprising up to 54 by weight relative to the weight of said chlorine-containing polymer of said at least one hydrotalcite or dawsonite.

15. The heat-stable composition as defined by claim 6, comprising from 0.01% to 0.6% by weight of said at least one organozinc compound (i), and from 0.02% to 2% by weight of said at least one organocalcium, organobarium, organomagnesium or organolanthanide compound (ii).

16. The heat-stable composition as defined by claim 7, comprising from 0.05% to 34 by weight of said at least one zinc stannate and/or zinc hydroxystannate (iv).

17. The heat-stable composition as defined by claim 10, comprising from 0.01% to 24 by weight of said $\beta$-diketone.

18. The heat-stable composition as defined by claim 11, comprising from 0.05% to 2% by weight of said at least one 1,4-dihydropyridine monomer or polymer.

19. The heat-stable composition as defined by claim 14, comprising from 0.02% to 2% by weight of said at least one hydrotalcite or dawsonite.

20. A shaped article comprising the heat-stable composition as defined by claim 1.

21. The shaped article as defined by claim 20, comprising a bottle.

22. The shaped article as defined by claim 20, comprising a film.

23. The heat-stable composition as defined by claim 1, said at least one chlorine-containing polymer comprising PVC.

* * * * *